(12) United States Patent
Glania

(10) Patent No.: US 8,756,682 B2
(45) Date of Patent: Jun. 17, 2014

(54) METHOD AND SYSTEM FOR NETWORK INTRUSION PREVENTION

(75) Inventor: Sebastian Glania, Balingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/019,958

(22) Filed: Dec. 20, 2004

(65) Prior Publication Data

US 2006/0137003 A1 Jun. 22, 2006

(51) Int. Cl.
*H04L 29/06* (2006.01)

(52) U.S. Cl.
CPC ............ *H04L 63/1441* (2013.01); *H04L 63/14* (2013.01); *H04L 63/1408* (2013.01)
USPC ..................... 726/22; 726/13; 726/14; 726/23

(58) Field of Classification Search
USPC .......................................................... 726/11
See application file for complete search history.

(56) References Cited

U.S. PATENT DOCUMENTS

| 6,550,012 B1* | 4/2003 | Villa et al. ...................... 726/11 |
| 2002/0087886 A1* | 7/2002 | Ellis .............................. 713/201 |
| 2003/0014665 A1* | 1/2003 | Anderson et al. ............. 713/201 |
| 2005/0015624 A1* | 1/2005 | Ginter et al. .................. 713/201 |
| 2005/0144467 A1 | 6/2005 | Yamazaki ..................... 713/189 |

FOREIGN PATENT DOCUMENTS

WO    WO 03/005666 A2    6/2002    .............. H04L 29/00

OTHER PUBLICATIONS

Dan Sterne, "Active Network DDoS Defense," 2002, Proceedings of the DARPA Active Networks Conference and Exposition, pp. 1-11.*
John Ioannidis, "Implementing Pushback: Router-Based Defense Against DDoS Attacks", 2002, pp. 1-12.*
R.N. Smith and S. Bhattacharya, "Operating Firewalls Outside the LAN Perimeter," Performance, Computing and Communications Conference, 1999 IEEE International, XP010323674, ISBN 0-7803-5258-0, pp. 493-98, Feb. 10, 1999.
D. Schnackengerg, H. Holliday, R. Smith, K. Djahandari, and D. Sterne, "Cooperative Intrusion Traceback and Response Architecture (CITRA)," DARPA Information Survivability Conference & Exposition II, XP010549109, ISBN 0-7695-1212-7, pp. 56-68, Jun. 12, 2001.
PCT, "Written Opinion of the International Searching Authority," PCT/US2005/038392, 5 pgs, Oct. 25, 2005.

* cited by examiner

*Primary Examiner* — Benjamin Lanier

(57) ABSTRACT

According to some embodiments of the invention, a method for network protection is provided. The method includes receiving with a network security software a request from an entity to stop at least a portion of unauthorized network traffic from being transmitted through a firewall. The entity lacks control over the firewall and the network security software is operable to control the firewall. The method also includes using the network security software to automatically determine that the entity is an authorized entity authorized to make the request. The method also includes initiating a block of the unauthorized network traffic at the firewall in response to the automatic determination.

15 Claims, 10 Drawing Sheets

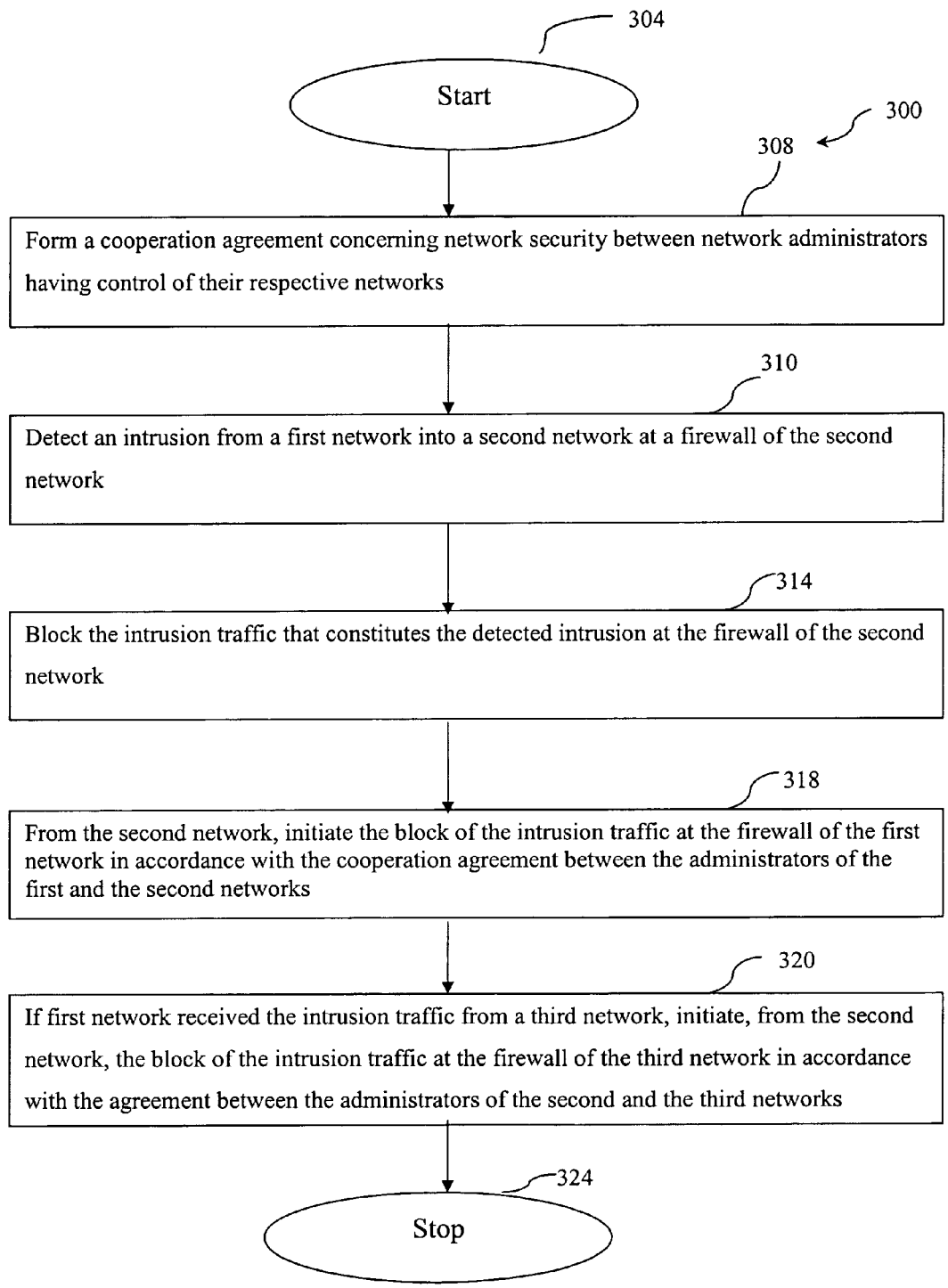

METHOD AND SYSTEM FOR NETWORK INTRUSION PREVENTION

TECHNICAL FIELD OF THE INVENTION

This invention relates generally to network security and more particularly to a method and system for network intrusion prevention.

BACKGROUND OF THE INVENTION

A computer network may be attacked from a variety of sources within and without the network. Further, more than one source positioned in different locations may launch separate and multiple attacks against the network. The administrator of the network may use a firewall to protect the network from these attacks. However, blocking the attack traffic at the firewall of the network may allow the attack traffic to use up bandwidth that may otherwise be used for communication between the attacked network and other networks/nodes.

SUMMARY OF THE INVENTION

According to some embodiments of the invention, a method for network protection is provided. The method includes receiving with a network security software a request from an entity to stop at least a portion of unauthorized network traffic from being transmitted through a firewall. The entity lacks control over the firewall and the network security software is operable to control the firewall. The method also includes using the network security software to automatically determine that the entity is an authorized entity authorized to make the request. The method also includes initiating a block of the unauthorized network traffic at the firewall in response to the automatic determination.

The invention has several important technical advantages. Embodiments of the invention may have some, none, or all of these advantages. In some embodiments, effects of an electronic attack are minimized by forming an agreement that allows administrators of different networks to at least partially control each other's firewalls in case of an attack. In other embodiments, the level of protection for a protected network is increased by blocking unauthorized traffic directed to the network at both a firewall of the network and a firewall from which the unauthorized traffic is transmitted. In other embodiments, the level of bandwidth used by unauthorized traffic is reduced by enabling a block of the unauthorized traffic at an upstream firewall.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which:

FIG. 5 is a flowchart illustrating one embodiment of a method of intrusion prevention.

DETAILED DESCRIPTION OF THE INVENTION

The invention is best understood by referring to FIGS. 1 through 6 of the drawings, like numerals being used for like and corresponding parts of the various drawings.

Figure 1:
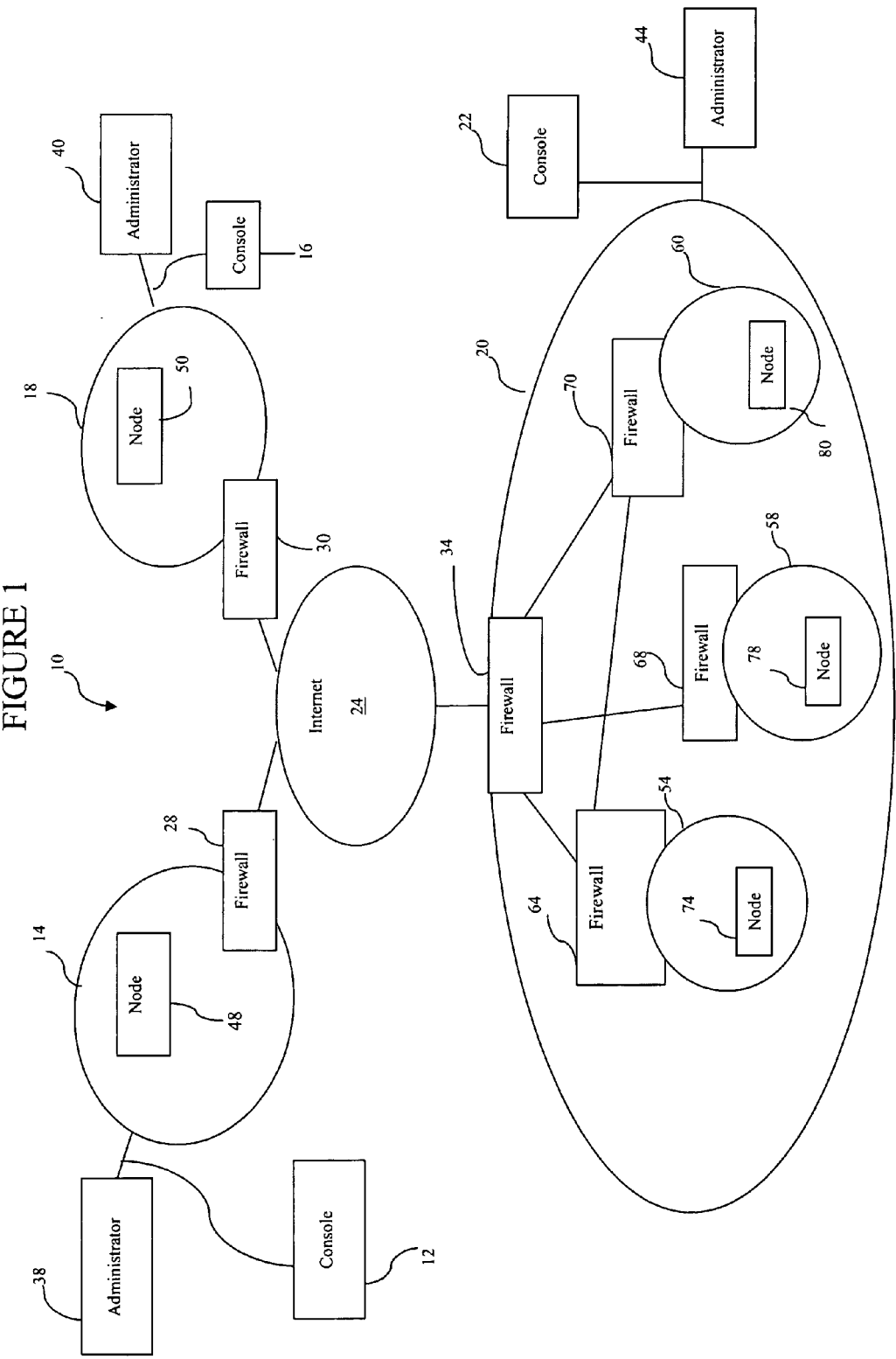
FIG. 1 is a schematic diagram illustrating a network environment 10 that may benefit from the teachings of the present invention.

FIG. 1 is a schematic diagram illustrating one embodiment of an environment 10 that may benefit from the teachings of the present invention. Environment 10 comprises networks 14, 18, and 20 that are coupled with each other through internet 24. In some embodiments, the Internet 24 may be omitted. The invention could be used with any plurality of networks interconnected in some manner. Networks 14, 18, and 20 comprise firewalls 28, 30, and 34, respectively. As shown in FIG. 1, firewalls 28, 30, and 34 are positioned at their respective networks' 14, 18, and 20 entry points to perform intrusion detection and prevention functions. In some embodiments, the intrusion detection function may be performed by a separate intrusion detection system (IDS). For the description provided below, it is assumed that the IDSs are built into the firewalls. However, the scope of the invention is not limited in any manner by this assumption.

Networks 14, 18, and 20 are controlled by administrators 38, 40, and 44, respectively. An administrator, such as administrator 44, may be one or more persons who have control over the configuration and operations of one or more networks. Administrators 38, 40, and 44 have access to computer consoles 12, 16, and 22, respectively. Each of consoles 12, 16, and 22 is operable to monitor its corresponding network and allow the administrator of the network, such as administrators 38, 40, or 44, to control the network. Networks 14 and 18 each comprise a plurality of nodes, the representation of which is shown as nodes 48 and 50, respectively. A network may have one or more sub networks. For example, network 20 comprises a plurality of sub-networks 54, 58, and 60. Sub-networks 54, 58, and 60 comprise firewalls 64, 68, and 70, respectively. Each of sub-networks 54, 58, and 60 may comprise a plurality of nodes, the representation of which is shown as nodes 74, 78, and 80, respectively. A node, such as nodes 74, 78, 80, is a computing device that is operable to communicate over a network. Networks and sub-networks may be differentiated by firewalls through which traffic may pass to access a particular network or sub-network.

In some embodiments, administrator 44 may exercise direct control over network 20 and sub-networks 54, 58, and 60. In some embodiments, one or more sub-networks 54, 58, and 60 may have its own administrator that has authority delegated from administrator 44 of larger network 20. Administrators of sub-networks 54, 58, and 60 are not explicitly shown in FIG. 1. The invention is not limited to any particular method of administering a network.

Firewalls 28, 30, 34, 64, 68, and 70 are used to protect respective networks 14, 18, 20, 54, 58, and 60 by screening data traffic directed to the networks 14, 18, 20, 54, 58, and 60 for unauthorized activity and blocking the unauthorized activity. For example, firewall 64 of sub-network 54 may screen network traffic between node 74 and an outside node, such as node 50 in network 18 or node 78 in sub-network 58. In another example, firewall 34 of network 20 may screen network traffic transmitted to network 20 from any node or sub-network of network 20, such as node 74 or sub-network 58. An administrator responsible for a network may have the authority to configure some or all firewalls in the network, and control some or all of the firewalls using a console, such as consoles 12, 16, and 22. For example, administrator 38 of network 14 may have control over firewall 28 using console 12 because firewall 28 is a part of network 14. In another example, administrator 44 of network 20 may have control over firewalls 34, 64, 68, and 70 using console 22 because these firewalls 34, 64, 68, and 70 are parts of network 20. An administrator may be able to configure, and/or control (e.g. shutdown) a firewall with or without a console. In some embodiments, administrator 44 may not have direct control over firewalls 64, 68, and 70 of respective sub-networks 54, 58, and 60. A reason for such lack of control may be because administrator 44 may have delegated that authority to the respective administrators of sub-networks 54, 58, and 60, or for any other reason.

Two or more administrators of networks, such as administrators 38, 40, and 44, may agree prior to a network attack on their networks to allow the administrators to at least partially control each other's firewalls, such as firewalls 28, 30, 34, 64, 68, and 70. The consent to have another administrator exercise some level of control over one's own firewall is not necessarily granted mutually, in some embodiments. For example, administrator 38 may have an agreement with administrator 40 to exercise some level of control over firewall 30 of administrator 40, but administrator 38 may not have agreed to allow administrator 40 to control firewall 28 of administrator 38. As used herein, an "agreement" is any permission granted by one party to another with or without an offer, acceptance, or consideration, and the meaning of the term "agreement" is not limited by any requirements of contract law. An "agreement" may also include an arrangement made for two or more parties by an entity that has control over the parties. An example of such a scenario is described below in conjunction with FIGS. 3A and 3B.

The level of control to be exercised over a particular firewall by an administrator of another network, the duration of the control, and the type of control may vary depending on circumstances. For example, in some embodiments, administrator 38 may be allowed to block a particular type of network traffic transmitted from firewall 30 of network 18 without permission from administrator 40 who controls network 18. In some embodiments, administrator 38 may block a particular network traffic transmitted from firewall 30 of network 18 after administrator 40 grants permission to implement the block. For example, after receiving a request to block network traffic at firewall 30 from another network, firewall 30 may inform administrator 40 of the request and ask whether to grant the request. In some embodiments, the agreement may be such that some types of control are allowed without permission and other types of control are allowed only with permission. The specific terms of the agreement may vary depending on the circumstances of the agreement, such as the level of trust between administrators and the level of security threat faced by the administrators.

In some embodiments, forming, prior to a network attack, an agreement for some level of control over a firewall of another network is advantageous because such an arrangement may allow an administrator not only to block unauthorized traffic at his or her own firewall, but also to impose additional blocks on the unauthorized traffic at a firewall that is positioned upstream. Thus, the network can be protected using more than one firewall, and the network traffic that constitutes an attack can be prevented from reducing the amount of bandwidth available to authorized users of the attacked network. Additional details concerning agreement (s) between administrators and the operations related to the detection and the prevention of network intrusion are provided below in conjunction with FIGS. 2A through 5.

Figure 2A:
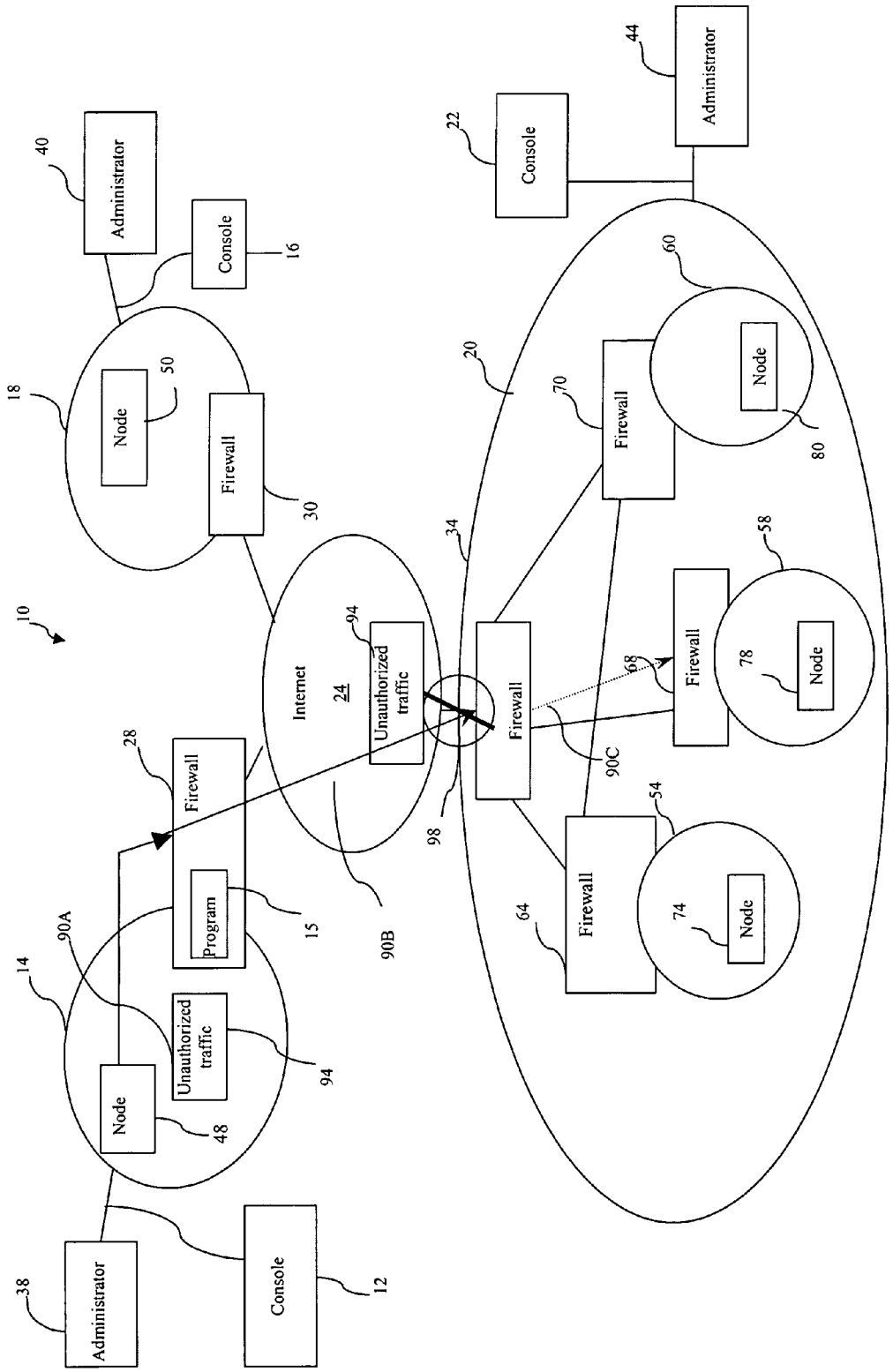
FIGS. 2A through 2B are schematic diagrams illustrating one embodiment of intrusion detection and prevention in the environment of FIG. 1 in an example scenario where an attack is launched from one network to another network.
Figure 2B:
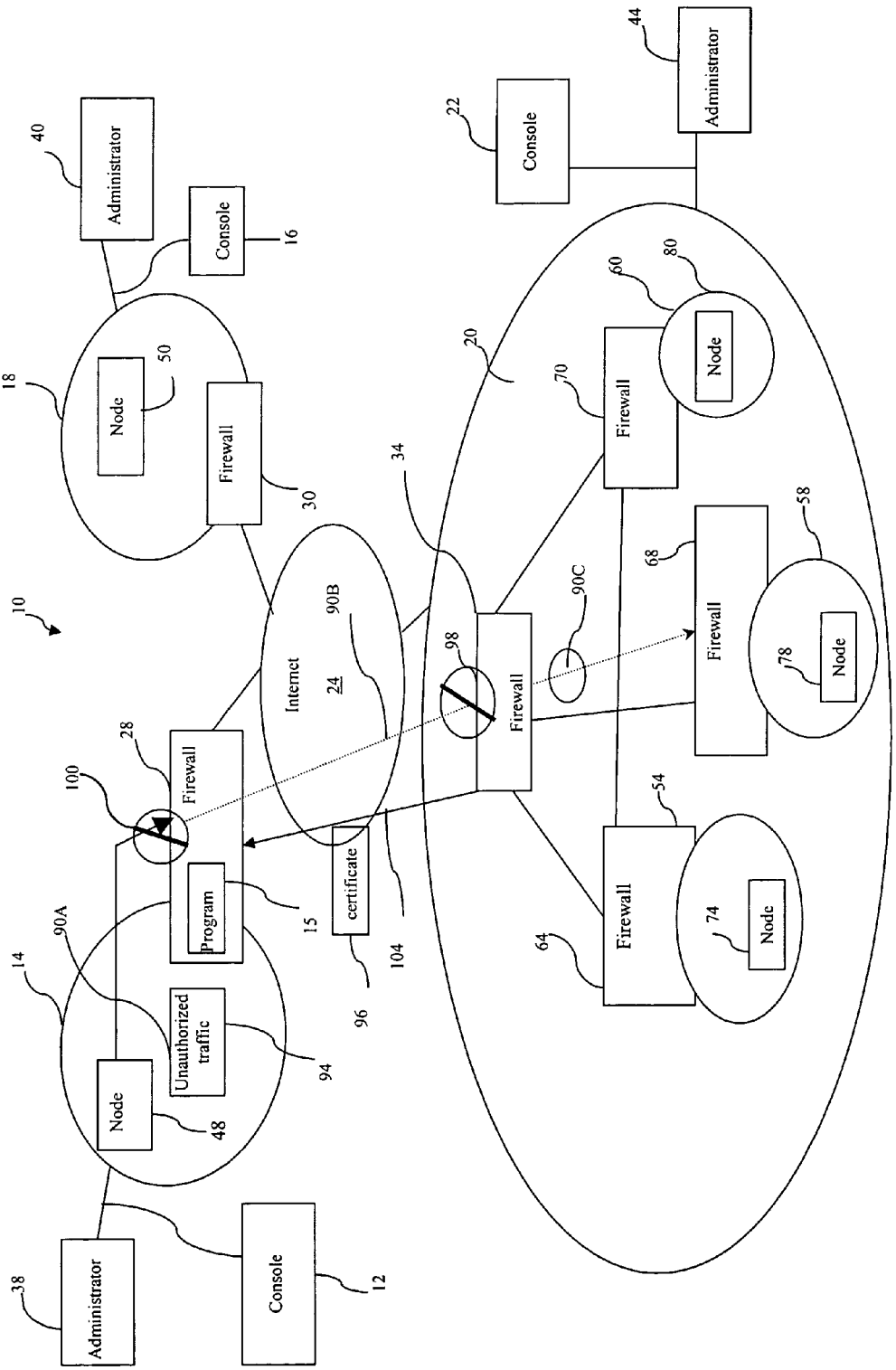

FIGS. 2A and 2B are schematic diagrams illustrating one embodiment of intrusion detection and prevention in environment 10 of FIG. 1 in an example scenario where an attack is launched from one network, such as network 14, to another network, such as network 20. FIGS. 2A and 2B are described jointly. In the example scenario shown in FIG. 2A, administrators 44 and 38 formed an agreement where administrator 44 is authorized by administrator 38 to control firewall 28 in case of an attack that is launched from network 14 against network 20. As used herein, a "firewall" refers to any device that is operable to at least partially block network traffic.

In this example attack, node 48 of network 14 transmits unauthorized traffic 94 destined to node 78 of sub-network 58 through firewall 28, internet 24, firewall 34, and firewall 68. Firewall 28 includes a network security program 15 that is operable to receive a request to block transmission of network traffic at firewall 28, and to verify the authenticity of the request. Unauthorized traffic 94 may be unauthorized for a variety of reasons. For example, node 48 may have been infected with a virus, worm, denial of service attack or other malicious code transmitted from another network or may have been turned into an intermediary node for an unauthorized access into network 20. The conceptual path that is taken by unauthorized traffic 94 is shown by an arrow 90. Arrow 90 comprises portions 90a, 90b, and 90c. Portion 90a represents the transmission of unauthorized traffic 94 from node 48 to firewall 28 in network 14. Portion 90b represents the transmission of unauthorized traffic 94 from firewall 28 to firewall 34. Arrow 90c represents the transmission of unauthorized traffic 94 that would take place if firewall 34 allowed unauthorized traffic 94 to pass.

However, in the scenario shown in FIG. 2A, firewall 34, which is at the entry point of network 20, identifies unauthorized traffic 94 as an intrusion and blocks unauthorized traffic 94. The block is represented by a stop sign 98. Because unauthorized traffic 94 is blocked at firewall 34, portion 90c of arrow 90 is shown as a dotted line. This is because the transmission of unauthorized traffic 94 from firewall 34 to firewall 68 and node 78 does not take place once the block is in place. After detecting the unauthorized traffic 94, firewall 34 informs administrator 44 about the attack. Firewall 34 may be operable to identify the source of the attack as network 14 and/or firewall 28, and provide any other relevant information to administrator 44.

Referring to FIG. 2B, after the detection of unauthorized traffic 94 and in accordance with the previously-formed agreement, firewall 34 may send a request to firewall 28 (which may also be referred to as a blocking signal) to block unauthorized traffic 94 at firewall 28 and/or node 48. The transmission of the request to block unauthorized traffic 94 at firewall 28 is represented by an arrow 104. The request is sent to firewall 28 because a firewall, such as firewall 34, is operable to determine a source of the attack, which, in this example, is firewall 28. In alternative embodiments, the firewall may not determine the source of the attack and an administrator 44 could cause the request to be sent to firewall 28 based upon some type of determination made by administrator 44. In some embodiments, the request might be sent by a network device other than firewall 34. The source of the attack could be abstractly determined to be network 14 or more specifically determined to be node 48.

The request may include any information and rule base that may be required for firewall 28 to perform the requested task, such as a source address, a destination address, a port number associated with unauthorized traffic 94, and a description of a task to be performed. The request to block unauthorized traffic 94 at firewall 28 may be transmitted when administrator 44 initiates the block at firewall 28 by directing firewall 34 to transmit the request to network 14. In some embodiments, firewall 34 may be configured to automatically transmit the request to a source of unauthorized traffic 94—firewall 28, in this case—in response to a detection of unauthorized traffic and without human involvement. These and other variations concerning the way in which a block of unauthorized traffic 94 at firewall 28 is initiated by another entity, such as firewall 34 and/or administrator 44, depend on the particular terms of the previously-formed agreement and the software implementing the agreement.

As a part of this request process, a certificate 96 may be sent that allows program 15 of firewall 28 to automatically determine that the request to block is indeed coming from an entity that is trusted and thus authorized to make the request, such as firewall 34/administrator 44. Any suitable authentication/verification method may be used, an example of which is shown as the transmission of certificate 96. In some embodiments, pursuant to the agreement between administrator 38 and administrator 44, program 15 of firewall 28 may be configured to receive the request from firewall 34 and initiate a block of further transmission of unauthorized traffic 94. The block of unauthorized traffic 94 at firewall 28 may be represented by a stop sign 100. Because unauthorized traffic 94 is blocked at firewall 28, portion 90b of arrow 90 is also shown as a dotted line in FIG. 2B.

In some embodiments, the terms of the agreement may require administrator 38 to configure program 15 of firewall 28 so that firewall 28 automatically blocks a portion of the communication (identified by the destination address, source address, and/or port number, for example) without human involvement in response to receiving the request from firewall 34. In such embodiments, the block of unauthorized traffic 94 at firewall 28 initiated from network 20 does not require prior permission from administrator 38. In some embodiments, the terms of the agreement may be such that upon receiving the request to block unauthorized traffic 94 at firewall 28, the request has to be approved by administrator 38 before the block is implemented at firewall 28. Because of the prior agreement between administrator 44 and administrator 38 to cooperate in the event of an intrusion, unauthorized traffic 94 can be blocked locally at firewall 34 and upstream at firewall 28. Further, in some embodiments, unauthorized traffic 94 is contained behind firewall 28, which prevents bandwidth usage by unauthorized traffic 94 between network 14 and network 20.

Figure 3A:
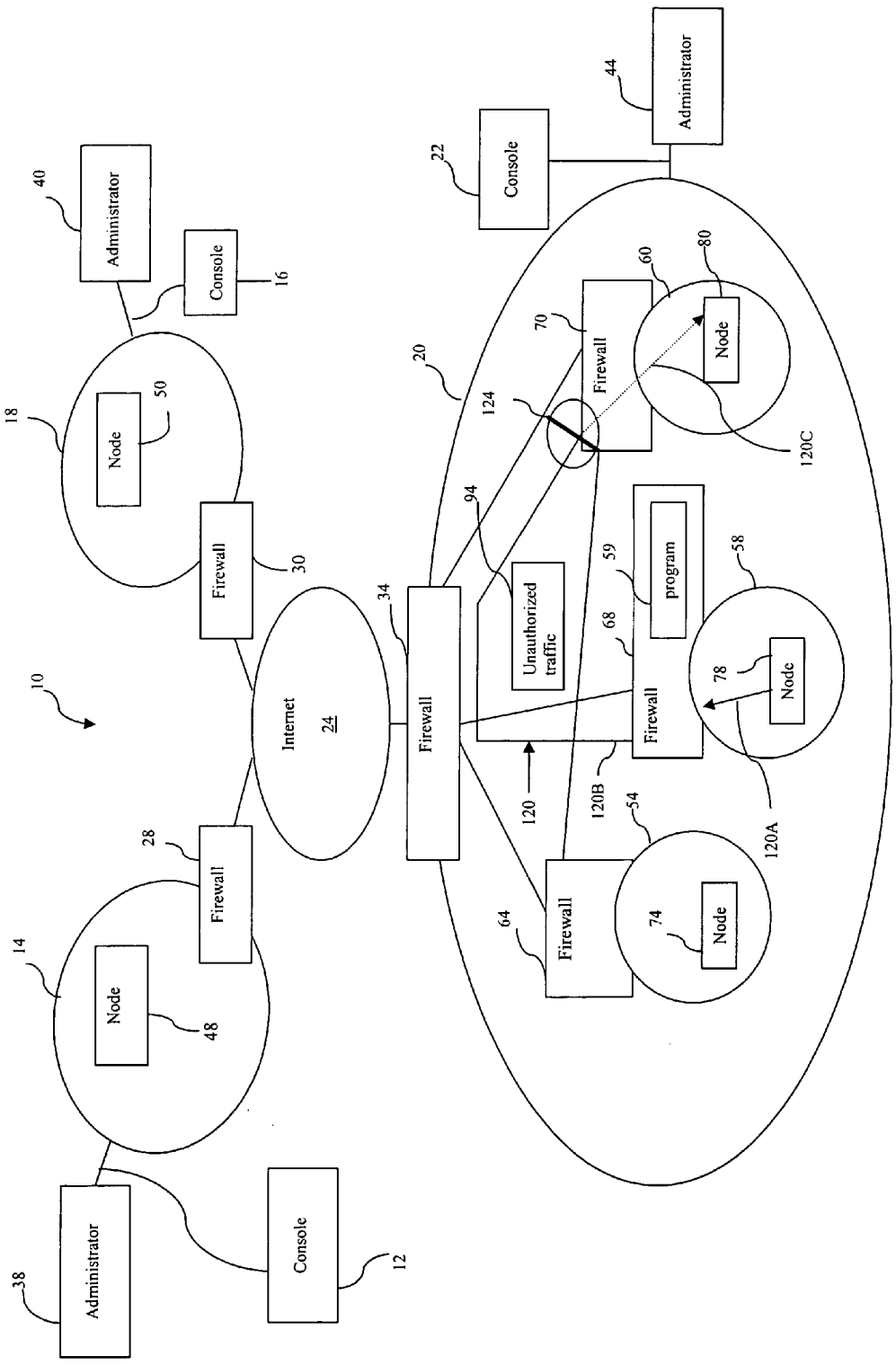
FIGS. 3A through 3B are schematic diagrams illustrating one embodiment of intrusion detection and prevention in the environment of FIG. 1 in an example scenario where a sub-network of a larger network is attacking another sub-network of the same larger network.
Figure 3B:
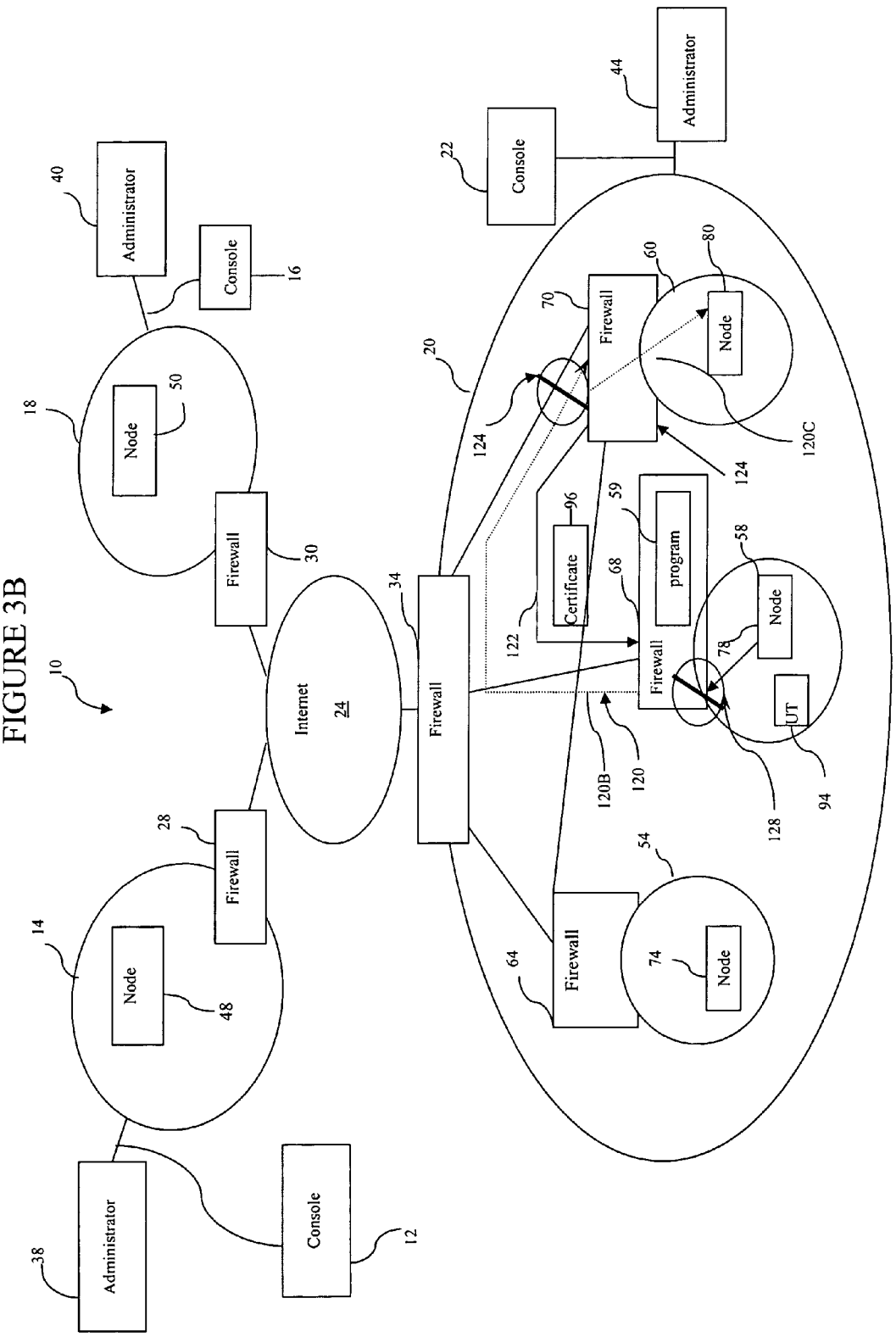

FIGS. 3A through 3B are schematic diagrams illustrating one embodiment of intrusion detection and prevention in the environment of FIG. 1 in an example scenario where a sub-network, such as sub-network 58, of a larger network is attacking another sub-network, such as sub-network 60, of the same larger network. FIGS. 3A and 3B are described jointly. In the example scenario shown in FIG. 3A, administrators of sub-networks 58 and 60 formed an agreement that allows the administrator of sub-network 60 to at least partially control firewall 68 in the event of an attack that is launched from firewall 68. The agreement may also specify that the control is allowed only when the attack is directed to network 60, in some embodiments. The agreement may have been formed in a variety of ways, including situations where the administrator of sub-network 60 is authorized by administrator 44 of larger network 20 to control firewall 68, or where the administrators of sub-networks 58 and 60 directly coordinate and form an agreement.

After forming the agreement, node 78 transmits unauthorized traffic 94 destined to node 80 by way of firewall 68 and firewall 70. Firewall 68 includes a network security program 59 that is operable to receive a request to block transmission of network traffic at firewall 68, and to verify the authenticity of the request. The transmission of unauthorized traffic 94 from node 78 to node 80 is represented by an arrow 120. Arrow 120 comprises portions 120a, 120b, and 120c. When firewall 70 receives unauthorized traffic 94, firewall 70 recognizes further transmission of unauthorized traffic 94 as an intrusion and blocks further transmission of unauthorized traffic 94, as shown by a stop sign 124. Because unauthorized traffic 94 is blocked at firewall 70, portion 120c of arrow 120 is shown as a dotted line.

Referring to FIG. 3B, in response to a detection of unauthorized traffic 94 and in accordance with the previously-formed agreement, firewall 70 transmits a request to program 59 of firewall 68 to block unauthorized traffic 94 at firewall 68. The transmission of the request is represented by an arrow 122. In order to allow program 59 of firewall 68 to verify that the request is coming from a trusted entity, firewall 70 may send certificate 96 to program 59 of firewall 68. In response to receiving the request, and in some embodiments verifying that the entity sending the request has authority to make the request, program 59 of firewall 68 initiates a block of the transmission of further unauthorized traffic 94. The request may be transmitted and honored with or without human involvement, as described above in conjunction with FIGS. 2A and 2B.

Because further unauthorized traffic 94 has been blocked upstream at firewall 68 as well as at firewall 70, sub-network 60 is protected and the spreading of unauthorized traffic 94 to other parts of network 20, such as sub-network 54, is prevented. Additionally, the blocking of further unauthorized traffic 94 increases the available bandwidth between sub-networks 58 and 60 that can be used for other authorized functions.

Figure 4A:
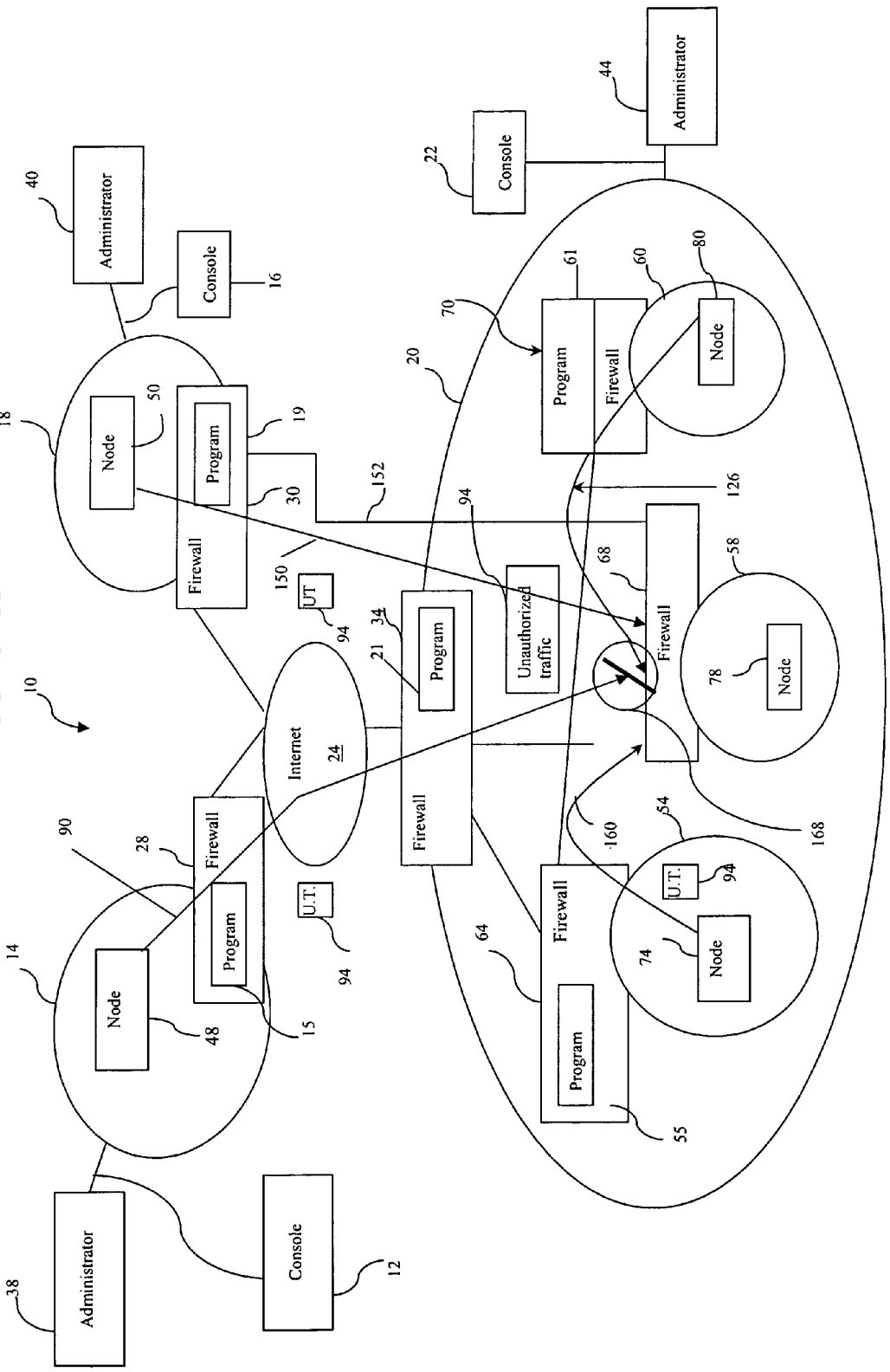
FIGS. 4A through 4C are schematic diagrams illustrating one embodiment of intrusion detection and prevention for the environment of FIG. 1 in an example scenario where multiple attacks are launched from different sources against a network.
Figure 4B:
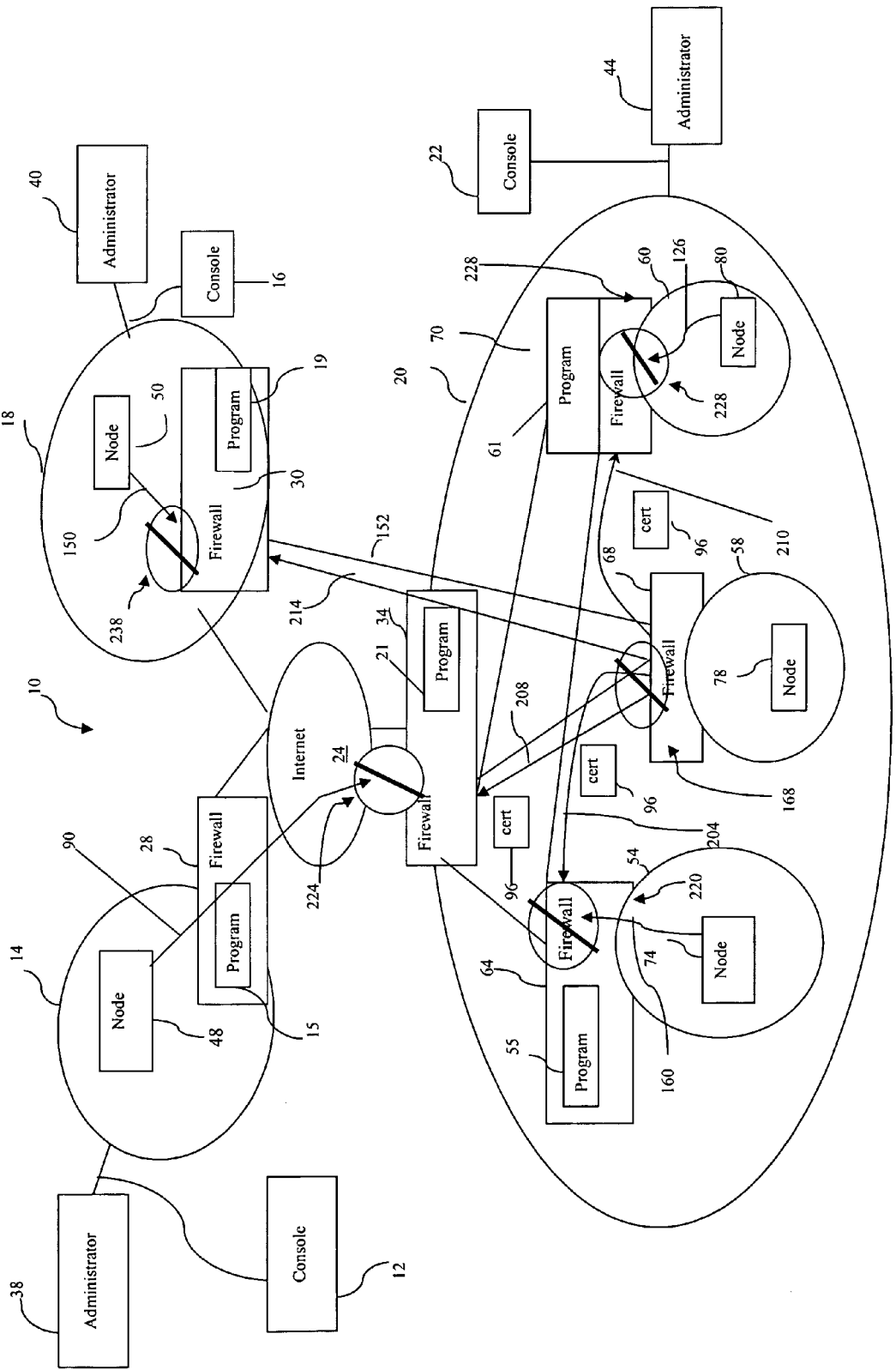
Figure 4C:
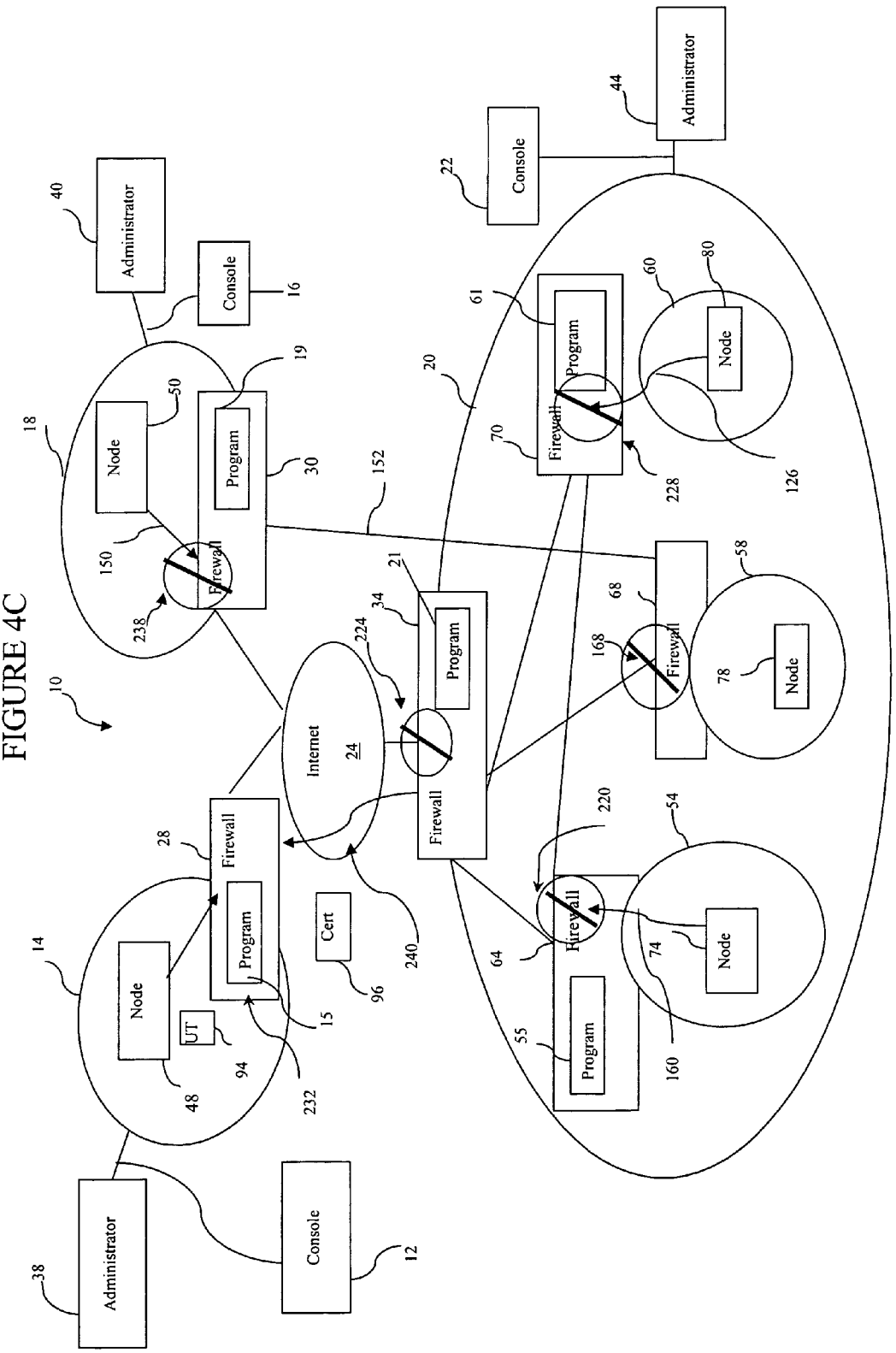

FIGS. 4A through 4C are schematic diagrams illustrating one embodiment of intrusion detection and prevention for environment 10 of FIG. 1 in an example scenario where multiple attacks are launched from different sources 14, 18, 54, and 60 against sub-network 58. FIGS. 4A through 4C are described jointly. In the example scenario shown in FIG. 4A, administrators of networks 14, 18, 20, and/or sub-networks 54, 58, and 60, which include administrators 38, 40, and 44, formed one or more agreements that allow the administrator of sub-network 58 to at least partially control firewalls 28, 30, 34, 64, and 70 in the event of an attack that is launched from any or all of firewalls 28, 30, 34, 64, and 70. The agreements may also specify that the control is allowed only when the attack is directed to sub-network 58, in some embodiments; however, one or more agreements may stipulate that control may be exercised in other circumstances, such as an attack on a third party.

In some embodiments, firewalls 28, 30, 34, 64, and 70 comprise network security programs 15, 19, 21, 55, and 61, respectively. Each of firewalls 15, 19, 21, 55, and 61 is operable to receive a request to block transmission of network traffic at a firewall, and to verify the authenticity of the request.

In the example scenario shown in FIG. 4A, a path 152 that does not include internet 24 and firewall 34 exists between network 18 and sub-network 58. Such a path may be established depending on the particular relationship between sub-network 58 and network 18, such as a service provider-customer relationship. As shown in FIG. 4A, unauthorized traffic 94 is transmitted from multiple sources, such as networks 14, 18, 54, and 60, and they are all destined to sub-network 58. The transmission of unauthorized traffic 94 from network 18 to sub-network 58 is represented by an arrow 150. The transmission of unauthorized traffic 94 from sub-networks 54 and 60 are represented by arrows 160 and 126, respectively. The transmission of unauthorized traffic 94 from network 14 is represented by arrow 90. After a detection of these intrusion attempts, firewall 68 blocks all further unauthorized traffic 94 from networks 14, 18, 54, and 60. The blocking of further unauthorized traffic 94 is shown by a stop sign 168.

Referring to FIG. 4B, in accordance with the previously-formed agreement(s), firewall 68 transmits requests to block further unauthorized traffic 94 at upstream firewalls 64, 34, 30, and 70. The transmissions of these requests are represented by arrows 204, 208, 214, and 210, respectively. To allow respective programs 55, 21, 19, and 61 of firewalls 64, 34, 30, and 70 to verify that the requests are coming from a trusted entity, firewall 68 may also transmit certificates 96 to programs 55, 21, 19, and 61. In response to receiving the requests and determining that the entity sending the requests is authorized to make the request using certificates 96, respective programs 55, 21, 19, and 61 of firewalls 64, 34, 30, and 70 initiate a block of the transmission of further unauthorized traffic 94, as shown by stop signs 220, 224, 238, and 228. The request may be transmitted and honored with or without human involvement at each of firewalls 64, 34, 30, and 70, as described above in conjunction with FIGS. 2A through 3B.

Referring to FIG. 4C, in some embodiments, a firewall 34 may transmit a request to program 15 of firewall 28 to block further unauthorized traffic 94 at firewall 28. The transmission of the request is represented by an arrow 240. Firewall 34 may also transmit certificate 96 to allow program 15 of firewall 28 to automatically determine that the request is transmitted from an entity that is trusted and thus authorized to make the request. In response to receiving the request, program 15 of firewall 28 initiates a block of the transmission of further unauthorized traffic 94. The block of unauthorized traffic 94 at firewall 28 is shown by a stop sign 232. As shown in FIG. 4C, unauthorized traffic 94 is contained within their respective sources, such as networks (or sub-networks) 14, 18, 60, and 54. This is advantageous in some embodiments because the network usage devoted to unauthorized traffic may be reduced during an attack.

The agreement that allows firewall 34 to initiate a block of unauthorized traffic 94 at firewall 28 may be between administrators 44 and 38, or between the administrator of sub-network 58 and administrator 38. In case of the former, the administrator of sub-network 58 may request administrator 44 to initiate the block at firewall 28 under the agreement between administrators 44 and 38. In an example where sub-network 58 is a network separate from network 20, but the administrator of sub-network 58 has an agreement with administrator 44, the administrator 58 may request administrator 44 under that agreement to initiate the block of unauthorized traffic 94 at firewall 28 in accordance with the agreement between administrators 38 and 44. In such an example, the first agreement between the administrator of network 58 and administrator 44 and the second agreement between the administrators 38 and 44 allow the block at another administrator's firewall on behalf of/at the request of a third party.

Thus, in some embodiments of the invention, even in a case where no agreement exists between two administrators, a chain of agreements that connects the two administrators may be used to block unauthorized traffic at a particular firewall.

Although firewalls 34, 70, and 68 of FIGS. 2B, 3B, and 4B, respectively, are described as example transmitters of the requests to stop transmitting unauthorized traffic, any suitable entity may be a transmitter of the request. As used in this document, an "entity" may refer to a person, a device, software, or any other legal or natural entity. Further, although a network security program, such as programs 15, 19, 21, 55, and 61 shown in FIG. 4C, are shown as installed in a firewall, a network security program may be installed in any suitable node coupled to the firewall. For example, program 15 may be installed in console 12.

FIG. 5 is a flowchart illustrating one embodiment of a method 300 for preventing network intrusion. Some or all acts of method 300 may be implemented using example devices shown in FIGS. 1 through 4C. However, any suitable device or combination of devices may be used to implement method 300. Devices shown in FIGS. 1 through 4C are used as examples to describe some embodiments of method 300. However, the implementation of method 300 is not limited to the description provided below.

Method 300 starts at step 304. At step 308, two or more administrators, such as administrators 38, 40, and 44, form a cooperation agreement concerning network security. The agreement allows an administrator to at least partially control the operation of another administrator's firewall. In some embodiments, the agreement allows the administrators to control each other's firewalls. In some embodiments, agreements allow the respective firewalls of the administrators to automatically control one or more other firewalls with or without permission from the administrator of the controlled firewall.

At step 310, a firewall of an administrator who was a party to the agreement of step 308 detects an intrusion launched from a network of another administrator. For example, firewall 34 of network 20 may detect unauthorized traffic 94 that was transmitted from firewall 28. At step 314, unauthorized traffic 94 is blocked at firewall 34.

At step 318, firewall 34 initiates a block of further unauthorized traffic 94 at firewall 28 in accordance with the agreement formed between administrator 44 and administrator 38 prior to the attack. For example, a network security program, such as program 15 shown in FIG. 4C, may receive a request from firewall 34 to block the unauthorized traffic at firewall 28. Program 15 may authenticate the request and initiate the block. At step 320, if network 14 received unauthorized traffic 94 that it transmitted to network 20 from a third party, such as network 18, firewall 28 may transmit a request to firewall 30 to block further unauthorized traffic 94 at firewall 30. This may be performed because of an agreement between administrators 38, 40, and 44, or because of a chain of agreements, such as a first agreement between administrators 44 and 38, and a second agreement between administrators 38 and 40. Method 300 stops at step 324.

Figure 6:
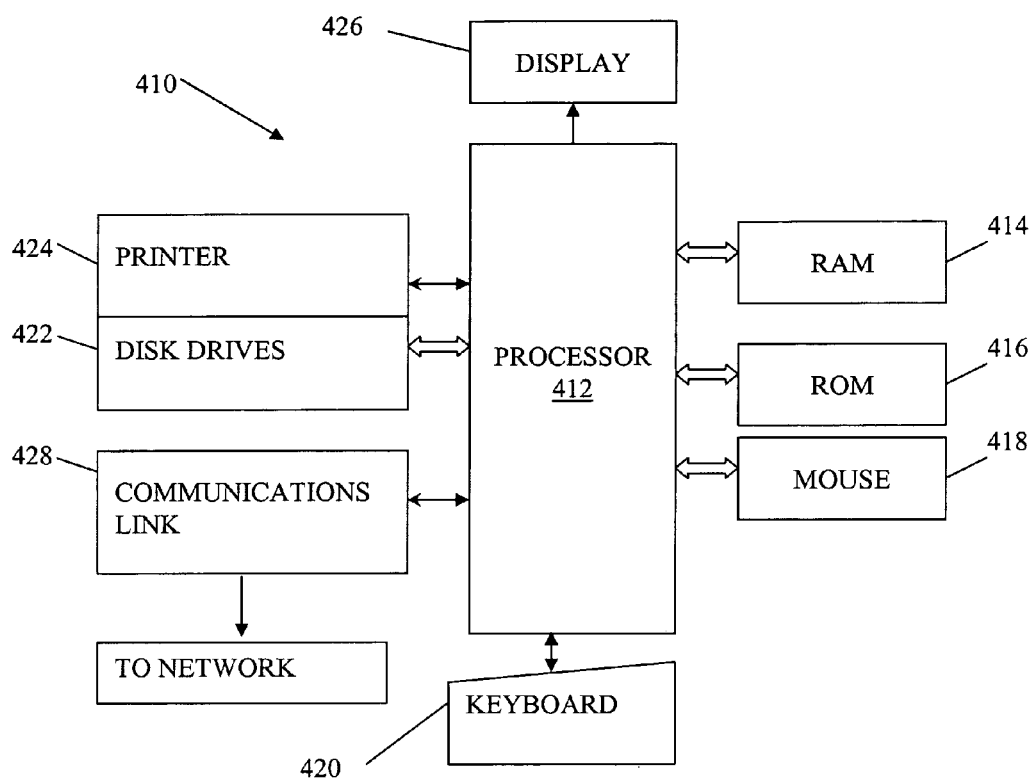
FIG. 6 illustrates a block diagram of a general purpose computer that may be used in accordance with the present invention.

FIG. 6 illustrates a general purpose computer 410 that may be used in connection with one or more of the pieces of software, such as programs 15, 19, 21, 55, and 61 shown in FIG. 4C, employed by the present invention. General purpose computer 410 may be adapted to execute any of the well-known OS2, Unix, Mac-OS, Linux, and Windows operating systems or other operating systems. General purpose computer 410 comprises processor 412, random access memory (RAM) 414, read-only memory (ROM) 416, mouse 418, keyboard 420 and input/output devices such as printer 424, disk drives 422, display 426 and communications link 428. The present invention may include programs that may be stored in RAM 414, ROM 416, removable storage, PRAM, NV-RAM, or disk drives 422 and may be executed by processor 412. Communications link 428 may be connected to a computer network but could be connected to a telephone line, an antenna, a gateway, a wireless local area or wide area network, or any other type of communication link. Disk drives 422 may include a variety of types of storage media such as, for example, floppy disk drives, hard disk drives, DVD-ROM drives, RAM disks, compact flash card, memory stick, CD ROM/RAM/RW or DVD ROM/RAM/RW drives or magnetic tape drives. Although this embodiment employs a plurality of disk drives 422, a single disk drive 422 could be used without departing from the scope of the invention. FIG. 6 provides one example of a computer that may be used with the invention. The invention could be used with computers other than general purpose computers as well as general purpose computers without conventional operating systems. Computer 410 may also be a system designed to perform specific functions, or may be included in a system that performs a specific function. For example, computer 410 may be configured to perform the functions of a firewall, and/or may be included in a firewall system.

The invention includes logic contained with a medium. In this example, the logic comprises computer software executable on a general purpose computer. The media may include one or more storage devices associated with general purpose computer 410. The invention may be implemented with computer software, computer hardware, or a combination of software and hardware. The logic may also be embedded within any other medium without departing from the scope of the invention.

The invention may employ multiple general purpose computers 410 networked together in a computer network. Most commonly, general purpose computers 410 may be networked through the Internet, and/or in a client server network. The invention may also be used with a combination of separate computer networks each linked together by a private, virtual private, or public network.

Although some embodiments of the present invention have been described in detail, it should be understood that various changes, substitutions, and alterations can be made hereto without departing from the spirit and scope of the invention as defined by the appended claims.

To aid the Patent Office, and any readers of any patent issued on this application in interpreting the claims appended hereto, Applicant wishes to note that he does not intend any of the appended claims to invoke ¶ 6 of 35 U.S.C. §112 as it exists on the date of filing hereof unless "means for" or "step for" are used in the particular claim.

What is claimed is:

1. A method for network protection of a first network from unauthorized network traffic received from a second network, the method comprising:
    pre-installing a first network security software on a first firewall associated with the first network and controlled by a first entity;
    pre-installing a second network security software on a second firewall associated with the second network and configured to be controlled by a second entity;
    receiving a permission from the second entity to allow the first entity to control the second network security software;
    wherein, in response to the first firewall receiving the unauthorized network traffic,
    blocking the unauthorized network traffic with the first network security software from reaching nodes on the first network;
    detecting with the first network security software on the first firewall whether the unauthorized network traffic is originating from the second network;
    providing a request from the first network security software to the second network security software in accordance with the permission; and
    in response to the second entity authentication of the request, activating, with the first network security software, the second network security software to block the unauthorized network traffic from leaving the second network.

2. The method of claim 1, wherein the initiation of the block occurs without permission of a human network administrator.

3. The method of claim 1, comprising:
    communicating to a human administrator of the second firewall that the request is received and that the first entity is an authorized entity; and
    receiving permission to block the portion of unauthorized network traffic from the human administrator in response to the communication;
    wherein the initiation of the block occurs only after the permission is received.

4. The method of claim 1, comprising:
    using the network security software to automatically determine, based on the certificate, that the first entity is an authorized entity.

5. The method of claim 1, wherein the network security software is executed by the second firewall.

6. The method of claim 1, wherein the network security software is executed by a computer console that is coupled with the second firewall and accessible to a human administrator, and wherein initiating the block comprises initiating the block using the network security software after receiving permission from the human administrator.

7. The method of claim 1, wherein the first entity comprises a computer console operable to monitor a network that is not protected by the second firewall, and to transmit the request in response to a determination that the network has received the unauthorized network traffic transmitted through the second firewall.

8. A system for network protection from unauthorized network traffic, comprising:
    pre-installed first network security software on a first firewall associated with a first network and controlled by a first entity;
    pre-installed a second network security software on a second firewall associated with the second network and configured to be controlled by a second entity;
    a permission from the second entity to allow the first entity to control the second network security software;
    a computer having a processor;
    a computer-readable medium coupled with the processor wherein the second network security software is stored in the computer-readable medium and operable, when executed by the processor in response to the unauthorized network traffic received by the first firewall through the second firewall, to:
    detect with the first network security software on the first firewall the unauthorized network traffic is originating from the second network;
    receive, by the second entity, a request from the first entity to stop the unauthorized network traffic from being transmitted through the second firewall associated with the second entity;

receive, by the second entity, a certificate from the first entity;

determine from the certificate, by the second entity, that the first entity is an authorized entity authorized to make the request in accordance with the cooperation agreement; and activate with the first network security software, a block of the unauthorized network traffic with the second network security software at the second firewall in response to at least the automatic determination.

9. The system of claim 8, wherein the network security software is operable to initiate the block automatically without permission of a human network administrator.

10. The system of claim 8, wherein the network security software is further operable to:

communicate to a human administrator of the second firewall that the request is received and that the first entity is an authorized entity;

ask for permission from the human administrator to block the portion of unauthorized network traffic; and receive the permission;

wherein the initiation of the block occurs only after the permission is received.

11. The system of claim 8, wherein the computer comprises the second firewall.

12. The system of claim 8, wherein the computer is coupled to the second firewall and accessible to a human administrator of the second firewall, and wherein the network security software is operable to initiate the block after receiving permission from the human administrator.

13. The system of claim 8, wherein the first entity comprises a computer console operable to monitor a network that is not protected by the second firewall, and to transmit the request to the network security software in response to a determination that the network has received the unauthorized network traffic transmitted through the second firewall.

14. A method for network protection, comprising:

pre-installing a first network security software on a first firewall associated with a first network and controlled by a first entity;

pre-installing a second network security software on a second firewall associated with the second network and configured to be controlled by a second entity;

providing a permission from the second entity to allow the first entity to control the second network security software;

wherein, in response to the first firewall receiving unauthorized network traffic from the second firewall, detecting with the first network security software on the first firewall whether the unauthorized network traffic is originating from the second network;

receiving, by a network security software installed in the second firewall, a request from the first firewall to stop the unauthorized network traffic from being transmitted through the second firewall;

receiving, by the network security software of the second firewall, a certificate from the first firewall; determining from the certificate, by the network security software of the second firewall that the first firewall is an authorized entity authorized to make the request in accordance with the cooperation agreement;

communicating to a human administrator of the second firewall that the request is received and that the first firewall is an authorized entity;

receiving permission to block the network traffic from the human administrator in response to the communication; and in response to the permission to block the unauthorized network traffic, activating, with the first network security software, the second network security software to block the unauthorized network traffic at the second firewall.

15. The method of claim 14, comprising:

determining, at the first firewall, that the portion of unauthorized network traffic was received from the second firewall; and automatically transmitting the request to the second firewall, the request including a signature indicating that the first firewall has permission to make the request.

\* \* \* \* \*

UNITED STATES PATENT AND TRADEMARK OFFICE
CERTIFICATE OF CORRECTION

PATENT NO.         : 8,756,682 B2
APPLICATION NO.    : 11/019958
DATED              : June 17, 2014
INVENTOR(S)        : Glania It is certified that error appears in the above-identified patent and that said Letters Patent is hereby corrected as shown below:

In the Claims

Column 12, line 26, Claim 14, after "block the" insert -- unauthorized --.

Signed and Sealed this
Seventh Day of October, 2014

Michelle K. Lee
*Deputy Director of the United States Patent and Trademark Office*